United States Patent
Hogarth et al.

(10) Patent No.: US 6,337,116 B1
(45) Date of Patent: Jan. 8, 2002

(54) MULTILAYER COMPOSITE BODY

(75) Inventors: Ian W. Hogarth; Robert I. Wilkinson; Rachel F. Rothwell, all of Aberdeenshire (GB)

(73) Assignee: Pelikan Scotland Limited, High Wycombe (GB)

( * ) Notice: Subject to any disclaimer, the term of this patent is extended or adjusted under 35 U.S.C. 154(b) by 0 days.

(21) Appl. No.: 09/297,850

(22) PCT Filed: Nov. 5, 1997

(86) PCT No.: PCT/EP97/06120

§ 371 Date: Jul. 16, 1999

§ 102(e) Date: Jul. 16, 1999

(87) PCT Pub. No.: WO98/21031

PCT Pub. Date: May 22, 1998

(30) Foreign Application Priority Data

Nov. 8, 1996 (DE) .......................................... 196 46 212

(51) Int. Cl.[7] .................................................. B32B 9/00
(52) U.S. Cl. .................... 428/40.1; 428/40.2; 428/41.4; 428/323; 428/324; 428/447
(58) Field of Search ............... 428/40.1, 40.2, 428/41.4, 323, 324, 447

(56) References Cited

FOREIGN PATENT DOCUMENTS

| DE | 26 22 126 C3 | 9/1977 |
|---|---|---|
| DE | 27 53 675 A1 | 6/1979 |
| DE | 299 522 A5 | 6/1989 |
| DE | 38 34 007 A1 | 4/1990 |
| DE | 41 14 964 A1 | 12/1991 |
| WO | WO 89/12549 | 12/1989 |

OTHER PUBLICATIONS

Silikonisierte Kunststoff–Folien: Herstellung und Anwendung Adhäsion 1984—Heft 9.

Primary Examiner—Nasser Ahmad
(74) Attorney, Agent, or Firm—Fay, Sharpe, Fagan, Minnich & McKee, LLP

(57) ABSTRACT

Disclosed is a multi-layer composite body comprising a flexible auxiliary support and separating layer disposed on at least one side of the auxiliary support, which modifies the complete separation or the locally determined detachment of a functional layer which is in the superficial contact thereto. Said body is characterized in that the separating layer contains a continuous phase and a particle-like filling material in a concentration of approximately 0.01 to 50 wt. % with respect to the separating layer wherein the surface of the filling particles is completely covered by the continuous phase, the continuous phase contains reticulated polyorganosiloxane and the surface of the separation layer that lies opposite to the auxiliary support has a surface roughness of approximately 400 to 50,000 nm and a mean roughness value of approximately 40 to 5,000 nm. The functional layer can be removed from the auxiliary support with minimal effort or exhibits a desirable matte surface after being separated from the auxiliary support.

18 Claims, 2 Drawing Sheets

MULTILAYER COMPOSITE BODY

Figure 1:
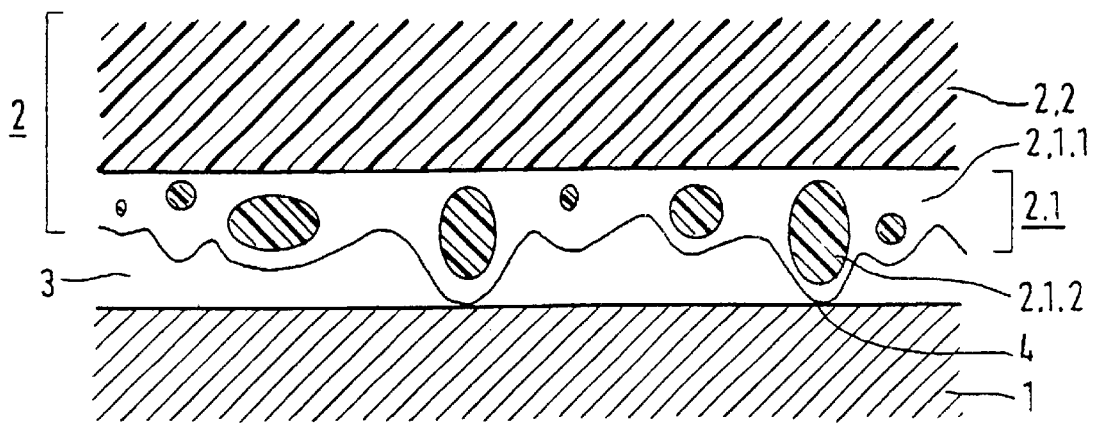

The present invention concerns a multi-layer composite body, having a flexible auxiliary carrier and a separation layer arranged on at least one side of the auxiliary carrier, which modifies the full separation or the local limited detachment of a functional layer positioned in flat contact with same.

A multi-layer composite body of the addressed type is, for example, the protective foil for self-adhesive decorative surface foils, self-adhesive labels, one- or dual-sided adhesive tapes, etc. The multi-layer composite body can constitute, as well, only a small part of a commercial product, for example the protective foil of a self-adhesive flap of an envelope. The multi-layer composite body can also be the protective foil of a self-adhesive wound-dressing bandage. All these applications have in common that the functional layer is a pressure-sensitive cement- or adhesive substance layer and the composite body constitutes a carrier or a protective foil, which prevents soiling of the adhesive layer or unwelcome adhesion to surfaces. Before utilization, this carrier or protective foil is pulled off.

Another use are applications where a functional layer is produced from a melt, a solution and/or a dispersion, and the carrier is immediately removed or removed subsequently with later application. In this connection, mention should be made of multi-layer correction ribbons, for example, for which a pigmented cover layer is formed on a carrier and, in most cases, an adhesive layer on same. This laminate serves to cover up errors in printed characters. In addition, mention can be made of color-transfer ribbons where a color-transfer layer is arranged on a carrier. During the printing process, the color-transfer layer is, for example, detached from the carrier and, by means of a heated print-head, transferred pictorially to a receiving substrate.

The flexible auxiliary carrier of the composite body is most frequently paper, however, a there is a strong trend towards foil substrates, because, based on the increased stability of foils in comparison with paper, it is possible to reduce, for economic reasons, the thickness of the flexible auxiliary carrier, and, with respect to winding, for reasons of capacity. To facilitate the separation between auxiliary carrier and functional layer, a separation is formed between auxiliary layer and functional layer which usually contains polyorganosiloxanes. Foil substrates have the advantage here that their surface, compared with paper, is non-porous and lesser amounts of polyorganosiloxanes for coating can be employed in economically beneficial manner. The lower surface roughness, however, constitutes, at the same time, one of the major draw-backs of the employed foil substrates, inasmuch as a smooth carrier layer requires a smooth coating. This smooth surface leads, in turn, to problems in handling.

With respect to applications where the adhesive layer is temporarily covered with a carrier, the smooth surface leads to full surface contact between adhesive layer and carrier, which, in turn, results in that the carrier can only be detached with great effort from the adhesive layer, which, under certain circumstances, may lead, for example, to tearing of labels.

In applications where a layer is precipitated from a liquid phase onto a carrier, one observes that the surface of the layer has an unwelcome shiny appearance after the carrier is removed, which can be attributed to its smooth surface. The smooth surface of the transferred layers also leads to more difficult lettering, for example, with respect to correction material.

Disclosure of U.S. Pat. No. 5,165,976 is helpful for better comprehension of the hereinafter described invention. This patent specification describes a substrate with a release layer. This release layer is obtained in that an emulsion is applied of a curable silicone system and a particle-shaped component, preferably a resin. The silicone-system is hardened under the influence of heat. Simultaneously, water is removed. As a result, a release layer with adjustable separation effect is created for the substrate, specifically in connection with applied adhesives. The substrate is preferably made of paper, preferably inexpensive, porous paper. With a content of approximately 35% by weight of silicone in the release layer, same is present in continuous phase, which envelopes the discrete particles. A lower percentage of silicone is not sufficient for envelopment of the particles, so that the properties of the resulting mixture are determined by both the silicone as well as by the particles. The release effect can therefore also be regulated by the quantity ratio of silicone to particles, by the type of particles, by degree of reciprocal action between silicone and particles, by cross-linkage degree of hardened silicone and by the coating weight. Based on the indication that an "emulsion" must be employed for coating of the substrates, one can conclude that overall a liquid system is involved, i.e. the emulsive dispersed particles, which finally are more or less embedded or bonded in the hardened silicone, do not constitute solid particles.

The silicone contents in the release layer ranges between 5 and 80% by weight, preferably between approximately 20 and 40% by weight in proportion to the total amount of the above two components. It appears from all this that with presence of a larger percentage in the total mass, the emulsive particles act counter to the release effect, i.e. the emulsive particles, if they are present, for example in the permissible amount of 95% by weight, largely exclude the release effect or even produce an adhesive effect. This is documented by the type of employed particles, for example, in form of an acrylic resin or a styrene/butadiene resin (SBR). In contrast thereto, the hereinafter described invention requires the bonding of a solid filler in the separation layer, which does not influence the properties of the silicone, but which produces a surface roughening of the release- or separation layer. The contents of DE 299 522 A5 largely agrees with the discussed U.S. Pat. No. 5,165,976. By way of technological background for the present invention, mention is made of the following reference material: DE 27 53 675 A1, DE 41 14 964 A1, DE 38 34 007 A1, DE 26 22 126 C3 and "Adhesion", 1984, volume 9, page 18/19.

The above indicated problems with respect to the state of the art are remedied according to the invention in that the separation layer contains a continuous phase and a particle-shaped filler in a concentration of approximately 0.01 to 50% by weight, relative to the separation layer, whereby the surface of the filler particles are totally covered by the continuous phase,—the continuous phase contains interlinked polyorganosiloxanes and the surface roughness of the separation layer, facing away from the auxiliary layer, has a roughness depth Rt of approximately 400 to 50000 nm and a median roughness value of approximately 40 to 5000 nm.

By incorporating the filler, the surface of the separation layer facing away from the auxiliary layer is made rough, so that a cross section of the profile shows elevations and depressions ("peaks" or "valleys").

In one specific embodiment, the functional layer can be a layer with a smooth surface. In this case, the functional layer comes into contact only with the "peaks" of the rough separation layer, whereby the smaller contact area permits easier detachment of the functional layer from the composite body. This specific embodiment is of particular interest with respect to applications where the functional layer is an adhesive layer. Specifically, the functional layer can be a cement layer, an adhesive layer, a transparent or tinted plastic layer, specifically a pigmented layer, a laminated cement layer and a transparent or tinted, specifically a pigmented layer. In another specific embodiment, the functional layer is in full contact with the separation layer. A functional layer, for example, the cover layer of a correction ribbon according to the invention can, correspondingly, be adjusted from "matte" dull to "translucent". In other words, this means that the lamination, if it is subsequently detached from the separation layer, becomes duller if more peaks or valleys are formed in the filler-laden silicone layer. With appropriately reduced roughness of the separation layer, this dull appearance greatly recedes and can also be converted to "shiny".

After the detachment of the functional layer from the separation layer, the now freely exposed surface of the functional layer constitutes a "negative" of the surface of the separation layer. As a result of this, a "dulled" or roughened surface of the functional layer is retained. This is of particular importance with layers which are precipitated onto a carrier from liquid phase, for example, with color-transfer layer ribbons and multi-layer correction ribbons. During the separation or detachment of the functional layer, the separation layer remains on the auxiliary carrier.

The kind of employed filler is not critical. Examples of suitable fillers are, among others, calcium carbonate, diatomaceous earth, clays, hollow glass pearls, aluminum silicate, plastics, magnesium-carbonate, PTFE and other polymer particle-shaped materials, talcum, calcite, fibers, lime, mica, amorphous silicon dioxide, silicates, pigments, etc. The filler can be selected from a wide range of materials, whereby it should be fully wetted by the continuous phase containing the inter-linked polyorganosiloxane, so that the entire surface of the filler particles is wetted.

Furthermore, the filler material must not have a detrimental effect upon the inter-linking process of the polyorganosiloxane. Also, the filler material must be firmly anchored to the flexible auxiliary carrier by the continuous phase. Basically, it is necessary—which is the goal according to the present invention—to totally encase the filler material particles in applications with highest "release effect" or separation effect. If a so-called "controlled-release" or a given separation- or release effect is to be attained, it does not prove to be a hindrance if only a small percentage of the filler particle surface is uncovered, for example, up to 10%. This situation will occur if a relatively high percentage of filler material is present in the total mass, for example approximately 50% and above.

Preferably employed are filler concentrations of approximately 0.01 to 50% by weight, preferably approximately 0.1 to 33% by weight and specifically approximately 0.5 to 15% by weight in proportion to the separation layer. Material with low oil-adsorption can be employed. High filler contents lowers the cost of the expensive silicone layer.

The filler material may be present in form of primary particles or agglomerates, with adjustment to be made based on the effective particle diameter. The average particle size is preferably 0.01 to 20 Fm, specifically approximately 0.05 to 10 Fm, whereby an average particle size in the range of approximately 0.01 to 8 Fm is particularly preferred.

Application volume of the polyorganosiloxane filler mixture usually lies in the range of approximately 0.3 to 3.0 g/m$^2$, specifically up to 1.5 g/m$^2$ relative to the solid matter percentage.

Selection of the filler material concentration and particle size in relationship to the coating thickness and the targeted effects must be done based on adhesion, cohesion and the peeling value of the layer. By adjustment of the refractory index of the filler material to the silicone system, it is possible to obtain a clear, roughened layer; with different refractory indices, translucent surfaces can be obtained. Where transparent appearance is not important, translucent coating can be formed in order to check the coating property of the foil on the layer during the lamination process. In order to check the coating property on the second side, it is possible to employ coloring substances or UV tracers.

The inclusion of filler particles in the separation layer has the result that the border region between separation layer and functional layer has a roughness depth Rt of at least approximately 400 and an average roughness value Ra of at least approximately 40 nm. According to the invention, the Rt amounts to approximately 40 to 50000 nm, specifically approximately 600 to 2500 nm, and Ra approximately 40 to 5000 nm, specifically approximately 77 to 250 nm. Particularly preferred are Rt-values of at least approximately 650 nm and an Ra of at least approximately 80 nm.

If the roughness depth Rt falls below approximately 400 nm, a more or less pronounced blocking effect sets in during the production of the multi-layer composite body or the multi-layer composite foil. In case the roughness depth Rt of 50000 nm is surpassed, the separation layer becomes too thick or also too rough with the result that during subsequent coating steps too much material would be lost, since it would enter into the deep valleys of the highly roughened separation layer. Corresponding considerations apply with respect to the basic conditions for the average roughness value Ra.

The term roughness depth Rt designates the distance between basic and reference profile of a surface profile, i.e. the maximum peak/valley distance. The average roughness value Ra is the mean absolute distance between reference profile and actual profile, which is also called center line average, i.e. the arithmetic average of the profile deviations from a center line. For purposes of the invention, the Rt or Ra values were ascertained by a FORM TALYSURF LASER (from RANK TAYLOR HOBSON INC.) Determination of roughness was done according to BS 1134.

The average layer thickness of the separation layer preferably amounts up to approximately 3 g/m$^2$, specifically up to approximately 1.5 g/m$^2$ (in relation to solid matter percentage). The specification of layer thickness in g/m$^2$ provides information concerning the practical or commercial application volume. This specification is usually employed with film substrates. It means that for example the preferred layer thickness of approximately 0.5 to 2 Fm corresponds to an application volume of 0.5 to 2 g/m$^2$ (in relation to the dry substance or the dried finished coating).

Commercial polysiloxane-systems can be classified into solvent-containing, also water systems, and solvent-free systems, which can be hardened or inter-connected by heat, by UV light, and by ionic beams. Standard methods can be used for application of these polysiloxane-containing layers to the flexible carrier such as: gravure print (direct, indirect roller application with several rollers) Meyer-wiper-blade, reverse roll, multi-roll coating (for example 5-roll coater) etc. After application of the polysiloxane layer, same is subjected to an inter-linking step.

The inter-linkable polyorganosiloxane-systems constitute systems with flow capability, containing functional groups with a multitude of inter-link possibilities. They are particularly accessible to thermal inter-linking induced by UV light or by ionic beam. In addition, inter-linking catalysts, such as peroxide, azo-compounds or organo-metallic compounds may be added. Technically highly important is the so-called peroxide inter-linking with the aid of radical formers, such as for example bis-(2.4-dichlorobenzoyl)-peroxide, di-benzoyl-peroxide, di-cumyl-peroxide, tert-butyl-perbenzoate or 2.5-bis-(tert-butyl-peroxy)-2.5-dimethylhexane.

Further being considered as polyorganosiloxane-systems are polyorganosiloxanes which contain per molecule at least two alkenyl- or aralkenyl groups, bonded to Si-atoms. Polyalkyl-alkenyl-siloxanes or polyaryl-alkenyl-siloxanes are named as example. In this case, the number of carbon atoms in the alkyl group lies preferably in the range from 1 to 18. Preferred examples for alkyl- or aryl groups are methyl and phenyl. Examples for the alkenyl groups are vinyl and allyl. The molar proportion of the alkyl or aryl groups to the alkenyl groups in the polyalkyl-alkenyl-siloxane or polyaryl-alkenyl-siloxane lies preferably in the range from 0.02 to 0.3 mol-%. Catalysts of the platinic type can be employed as interlinking catalysts, for example chloro-platinic acid in order to enhance the polymerization of the alkenyl groups.

Vinyl-group containing polyorgano-siloxanes can also be inter-linked with sulfur. The contents of vinyl groups of interlinking silicones should amount 1 to 4 mol-% and the amount of sulfur 2%.

Polyorganosiloxanes can also be interlinked to double bonds via addition reaction of Si—H . The employed catalysts are precious metal salts and -complexes, whereby the platinic derivatives are the most important.

Mercapto-functional polysiloxanes can be produced photo-chemically by addition of HS-groups to allyl- or vinyl-groups, in the presence of photo-initiators. Preferred mercapto-alkyl rests have a carbon number in the range from 1 to 4, whereby the other organic rests of the mercapto-functional poly-siloxanes preferably have between 2 to 3 carbon atoms or are phenyl. The methylvinyl-polysiloxane to be thereby brought to reaction preferably carries approximately 3 vinyl groups per molecule and is employed in such volume that one obtains 0.2 to 1.0 Si-bound vinyl rests per Si-bound mercapto-alkyl rest. If necessary, it is possible to incorporate a customary gelling inhibitor, such as de-hydroxy-phenoles and their alkyl-derivatives, also, perhaps, a photo-sensitizer, such as, for example, aromatic ketones, like acetophenone or benzophenone, or azo-compounds, such as azo-bis-isobutyric acid nitrile. Suitable systems are evident, for example, from DE-PS 26 126. Epoxy-functional poly-organosiloxanes can also be inter-linked in the presence of photo-chemically produced Lewis acids, for example from p-chlorobenzol-diazonium-hexafluoro-phosphate. Acryl-group containing silicones can also be photochemically interlinked.

Preferred methods employ UV radiation. The reasons are that only low heat is used and the foil is thus not exposed to the danger of warping, whereby a lesser thickness can be used. UV-interlinkable systems usually have a low viscosity and can therefore more easily be modified with additives.

The interlinking mechanism is largely insensitive to mixed-in additives. It is possible to add larger amounts of filler material without affecting the coating capability.

Interlinking with a- and a-rays takes place via the formation of free radicals. Instead of a-rays, it is also possible to work with ionic beams. Condensation interlinking also plays a role in the interlinking of polyorganosiloxanes. A silicone-bound hydroxyl group reacts with a group R, bound to silicone, which can, for example, be an alkoxy-, acyloxy-, amino-, hydroxy-, oximo- or amido group R, while HR is being split off. Depending upon the activity of the interlinking agent, the reaction takes place either with or without catalysts, so that either two-component systems are formulated or one-component systems. The standard commercial interlinkers mostly consist of mixtures from silicic acid esters and tin-catalysts, such as, for example, dibutyl-tin-diacetate, dioctyl-tin-maleinate, tin-(II)octoate or reaction products of these components or multi-valent isocyanates. An Si—H-group can react in the presence of basic catalysts or of Sn- and Pt-compounds with sinanol-groups, simultaneously developing hydrogen. By selection of type and amount of polysiloxane starter materials, it is possible to modulate the release capability of the separation layer. This aspect is of particular importance if a composite layer arrangement exists with several functional/separation layer border areas, which must be detached in pre-determined sequence. This case occurs regularly when the composite material is wound up into a roll. For proper un-rolling it is indispensable that the functional layer has less adhesion vis-a-vis the next loop than vis-a-vis the assigned separation layer. For that purpose, it is preferred that on the reverse side of the auxiliary carrier another separation layer is formed, which has higher release capability (separation layer with 100% release) than the (separation layer with controlled release) arranged between auxiliary carrier and functional layer. Said reverse-side separation layer is preferably likewise obtained according to the invention. Such formation of a reverse-side separation layer is also preferred in order to facilitate the transport of the composite body over rollers and smooth surfaces.

The auxiliary carrier preferably is a plastic foil, specifically of thermo-plastic material. Suitable as well are paper carriers and other carrier materials known in the state of the art. Particularly suitable plastic foils consist for example of thermoplastic polyesters or polyolefins. To be named as particularly suitable starter materials for same are, among others: polyalkylene-terephthalates, such as polyethylene-terephthalate, polybutylene-terephthalate or poly(1.4-cyclohexanedimethylene-terephthalate) polyethylene, polypropylene, polybutene, polyisobutene, polystyrene, cellulose derivatives, such as specifically cellulose acetate, cellulose butyrate and cellulose propionate and co-extrudates of, for example, polyethylene/polypropylene and laminates of, for example, paper and polyethylene, polyvinylacetate, polyvinylchloride, polyvinylalcohol, polyvinylbutyral, polyamide, ethylene-vinylacetate-copolymerisate, PEN, acrylnitrile/butadiene/styrene-copolymerisate (ABS), acryinitrile/styrene/acryl-ester-copolymerisate (ASA), styrene/acryl-nitril-copolymerisate (SAN), polycarbonate, polyamide, PEEK, nylon.

Preferred foils have a thickness of approximately 2 to approximately 400 Fm, specifically approximately 3.5 to 100 Fm and particularly preferred of approximately 3.5 to 50 Fm.

It has been shown, when producing silicone coated composite materials having a carrier, that when the manufacturing is done on a roller system (any selected coating system) there will be no significant problem with respect to the paper because of trapping of air. The situation is different, however, if the paper carrier is replaced by a plastic carrier or a foil carrier, which has no trapped air, but a smooth surface. In this case, there sets in a type of "eraser or rubber effect", so that it is impossible to pass the coated strip in the desired fashion over the different rolls of the coating system. It is possible, for example, based on said effect, that detrimental blocking occurs.

If this material is transferred to a jumbo-roller, there will occur, in addition, unwelcome tensions of the foil, as a result of which, the desired 'flatness' of the coated films is partially eliminated (crinkly appearance). These undesired symptoms have a further detrimental effect if the composite films or laminates are to be coated at a later date for example with an adhesive and they occur specifically in connection with the coating of polyolefin films, which have a greater elasticity compared, for example, with polyester films. These problems are completely eliminated according to the invention by the incorporation of pigments.

In addition, the invention has the following benefits: Due to the surface roughness of the separation layer, a multitude of drawbacks are avoided or at least minimized relative to separation layers of known composite structures. When sliding on stationary surfaces or rollers, the contact area vis-a-vis the composite body according to the invention is greatly minimized, which greatly suppresses the development of friction elasticity. Consequently, the separation layer has improved sliding behavior on static surfaces, which results in reduced electrostatic charging and in reduction or exclusion of problems related therewith, or in exclusion of oxidation of the upper surface foil, based on electrostatic discharge and the thereby caused irregularities of any subsequently applied coatings. When sliding along-side stationary surfaces or rollers, the contact surface towards the composite body according to the invention is greatly reduced, which greatly suppresses the formation of friction electricity.

When manufacturing the composite body according to the invention, transport of the auxiliary carrier over rollers or along smooth surfaces is made easier. In applications where the composite bodies according to the invention are employed for temporarily covering an adhesive layer, same comes into contact only with the "peaks" of the rough separation layer, whereby the smaller contact surface facilitates easier detachment or easier release from the composite body. In applications where a functional layer is produced on the carrier from a melt, a solution and/or a dispersion, a desirable matt (dull) surface of the functional layer is obtained, following the release from the carrier. As an example, one can cite a multi-layer correction ribbon which serves for covering up mistakes in printed characters. The exposed surface of the functional layer, following separation from the auxiliary carrier, represents a "negative" of the separation layer surface, thereby obtaining a matted [dulled] or roughened-up surface of the functional layer.

The microscopically rough surface appears pleasantly "matt" to the viewer. In case of a correction ribbon, it can, for example, easily be re-inscribed, whereby when inscribing is done with ink or China-ink, the danger of smearing is reduced or even eliminated and inscription with pencil is particularly facilitated, since due to the surface roughness, there is improved pencil lead abrasion.

It is of particular benefit with respect to the invention that in comparison with separation layers containing no filler materials, the application volume of polyorganosiloxane can be significantly reduced, which constitutes an important cost benefit. One outstanding benefit consists in that the functional layer of a multi-layer composite body can be detached with minimum effort, whereby, after separation, the functional layer presents the desirable degree of surface-"dullness". Another outstanding benefit—already addressed as well—consists in that the multi-layer composite body according to the invention slides very easily over rollers or stationary surfaces, for example in color tape cassettes or reel-off instruments. It is emphatically pointed out that the invention improves all teachings described initially in connection with the state of the art.

Thus, these known teachings, respectively developed further according to the invention, shall likewise constitute the object of the present invention.

Figure 3:
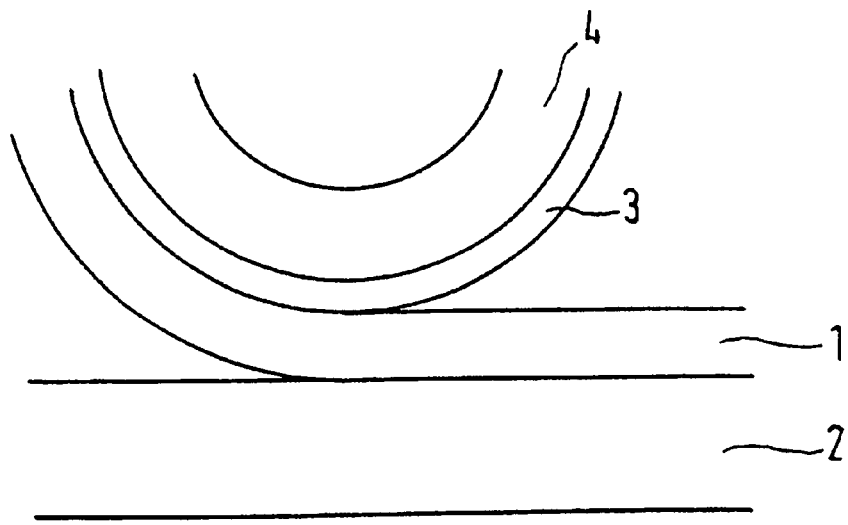
Figure 4:
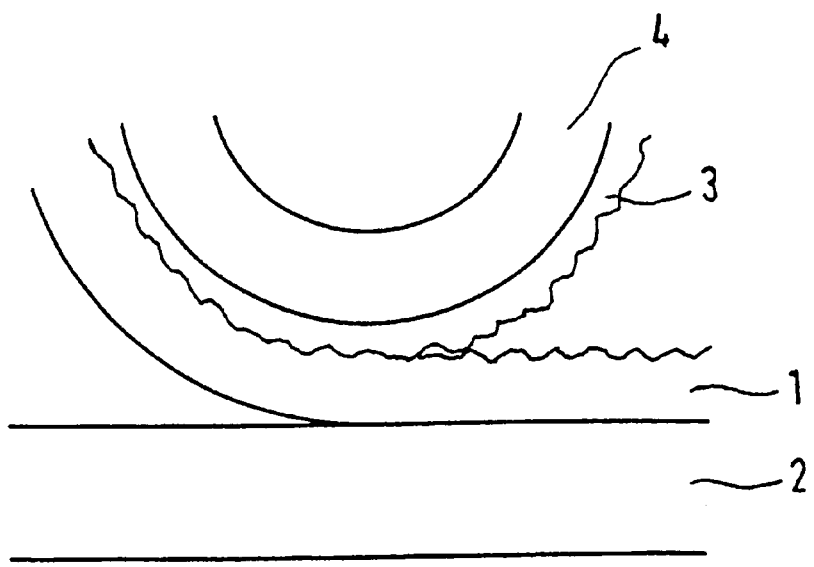

The surface roughness of the separation layer can also be beneficially utilized in regulating the initial adhesion of the transferred adhesive gum layer. This is schematically depicted in FIGS. 3 and 4. Transfer of an adhesive gum layer to a paper substrate 2 is shown, whereby the adhesive gum layer 1 is released in FIG. 3 from a customary carrier material 4, either by means of a smooth separation layer 3, and in FIG. 4 by a roughened-up separation layer 3, according to the invention. The instantaneous adhesive action of the rough side of the transferred adhesive substance layer is diminished, since the contact surface with a second substrate is restricted to the "peaks" of the adhesive substance layer. This permits, for example, removal and re-positioning in case the initial placement was incorrect. With pressing, however, the viscous melt-adhesive layer is compressed, so that a comparable final adhesive strength is obtained, as in the case depicted in FIG. 3.

The invention is explained in more detail by means of the attached drawings and the following examples:

FIG. 1 represents a specific embodiment of the invention in which a functional layer, having a smooth surface 1, comes only into contact with the "peaks" of the rough separation layer 2.1 of a multi-layer composite body, having, in addition, a flexible auxiliary carrier 2.2, so that air-filled spaces are created. The small contact area 4 permits easy removal of the functional layer from the composite body 2. The separation layer contains a continuous phase 2.1.1, containing an inter-linked polyorganosiloxane and a particle-like filler substance 2.1.2.

Figure 2:
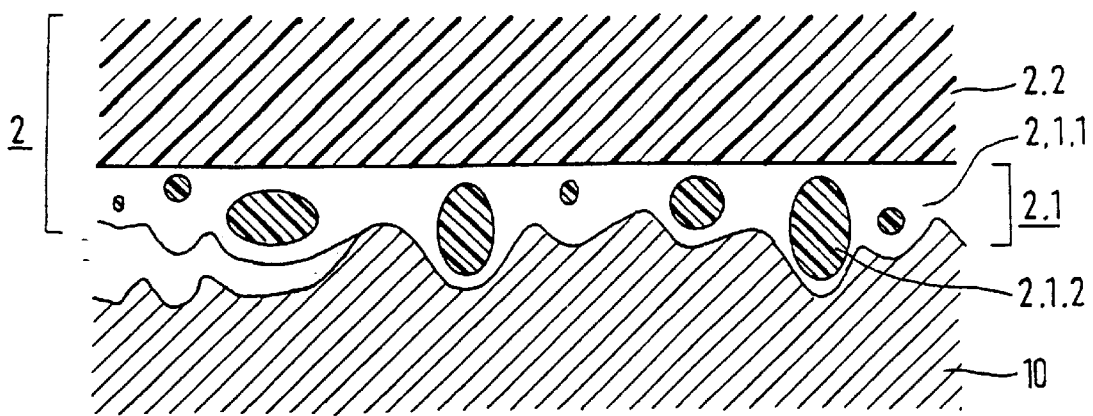

FIG. 2 depicts a rough functional layer 10, which is in full contact with the separation layer 2.1, which contains a continuous phase 2.2.1, containing an interlinked polyorganosiloxane and a particle-like filler substance 2.1.2. The separation layer 2.1 and the auxiliary carrier 2.2 form together the composite body 2 according to the invention. Following the separation of the functional layer from the separation layer (indicated on the left side of FIG. 2), the exposed surface represents a "negative" of the separation layer surface.

This results in obtaining a "dulled" or roughened-up surface of the functional layer.

In the following examples, coating masses were produced by mixing together the respectively specified components. These were applied by reverse coating to a polyester foil having a thickness of 20 Fm. The obtained coatings of examples 1 to 3 were subjected to UV-hardening. The silicone coating of Example 4 was hardened by means of ionic beam. The coatings of the examples 5 to 7 were thermally hardened, by heating them for 10 seconds at 110° C.

Subsequently, the friction coefficients of the obtained carrier materials were measured according to ASTM D1894/87. A lower friction coefficient value indicates low friction during transport over rollers and smooth surfaces and leads to the therewith connected benefits represented in the description. In this specific embodiment, it is of benefit if both sides of the flexible auxiliary carrier are coated with the separation layer, so that the reverse side of the composite body, which is not in contact with a functional layer, is also provided with a separation layer. The experimentally ascertained roughness depth Rt always ranged approximately 400 to 50000 nm and the average roughness value Ra between approximately 40 to 5000 nm.

EXAMPLE 1
Separation Layer with 100% Release without Filler Material (UV-System)

Comparative Example
Solvent-free Methylpolysiloxane

| | | | |
|---|---|---|---|
| Solvent-free Methylpolysiloxane capable to undergo addition-reactions | UV 9500 | G.E. Silicones Co. | 15.0 wt. pts. |
| Solvent-free Methylpolysiloxane capable to undergo addition-reactions | UV 9400 | G.E. Silicones Co. | 15.0 wt. pts. |
| Photoinitiator | UV 9380C | G.E. Silicones Co. | 0.6 wt. pts. |
| Adhesion-friction coefficient:*) | | | |
| Sliding-friction coefficient:*) | | | |

*)- These values were outside the measuring range, value > 3.0

EXAMPLE 2
Separation Layer with 100% Release with Filler Material (UV-hardenable)

| | | | |
|---|---|---|---|
| Solvent-free Methylpolysiloxane capable to undergo addition-reactions | UV 9500 | G.E. Silicones Co. | 15.0 wt. pts. |
| Solvent-free Methylpolysiloxane capable to undergo addition-reactions | UV 9400 | G.E. Silicones Co. | 15.0 wt. pts. |
| Photoinitiator | UV 9380C | G.E. Silicones Co. | 0.6 wt. pts. |
| Silicone dioxide, particle diameter approximately 2Fm | | Syloid ® 244 Grace GmbH | 1.2 wt. pts. |
| Adhesion-Friction Coefficient | 0.27 | | |
| Sliding-friction Coefficient | 0.28 | | |

EXAMPLE 3
Separation Layer with Controlled Release with Filler Material (UV-hardenable)

| | | | |
|---|---|---|---|
| Solvent-free Methylpolysiloxane capable to undergo addition-reactions | UV 9500 | G.E. Silicones Co. | 15.0 wt. pts. |
| Solvent-free Methylpolysiloxane capable to undergo addition-reactions | UV 9400 | G.E. Silicones Co. | 15.0 wt. pts. |
| Release controlling agent | UV 9430 | G.E. Silicones Co. | 70.0 wt. pts. |
| Photo-initiator | UV 9380C | G.E. Silicones Co. | 0.6 wt. pts. |
| Silicone dioxide, particle diameter approximately 7 nm | | Aerosil > 380 Degussa AG | 3.0 wt. pts. |
| Adhesion-friction coefficient | 0.18 | | |
| Sliding-friction coefficient | 0.23 | | |

EXAMPLE 4
Separation Layer with 100% Release with Filler Material (Ionic-beam Hardened)

| | | | |
|---|---|---|---|
| Solvent free Methylpolysiloxane capable to undergo addition reactions | RC450 | TH Goldschmidt AG | 100 wt. pts. |
| amorphous silicone dioxide, particle diameter approximately 3Fm | | Syloid ED3 ® Grace GmbH | 2 wt. pts. |
| Adhesion-friction Coefficient | 0.22 | | |
| Sliding-friction Coefficient | 0.28 | | |

EXAMPLE 5
Separation Layer with 100% Release with Filler Material (Thermal Hardening)

| | | | |
|---|---|---|---|
| pre-catalyzed, solvent-free polysiloxane with functional groups, capable of undergoing addition reactions | Dow 7702* | Dow Corning Corp. | 100 wt. pts. |
| Interlinking Agent | Dow 7215* | Dow Corning Corp. | 6 wt. pts. |
| Pure Silicone-dioxide, particle diameter approx. 4–8 Fm | TK 900 | Degussa AG | 2 wt. pts. |
| Adhesion-friction coefficient | 0.24 | | |
| Sliding-friction coefficient | 0.26 | | |

EXAMPLE 6
Separation Layer with Controlled Release with Filler Material (Thermal Hardening)

| | | | |
|---|---|---|---|
| Solvent-free Methylpolysiloxane, capable of undergoing addition reactions | Dehesive 920 ® | Wacker GmbH | 27.0 Wt. Pts. |
| Release Controlling Agent | CRA 17 | Wacker GmbH | 33.0 wt. pts. |
| Interlinking Agent | Interlinker 24 | Wacker GmbH | 2.4 wt. pts. |
| Catalyst | Catalyst OL | Wacker GmbH | 1.05 wt. pts. |
| Adhesion Provider | HF 86 | Wacker GmbH | 0.27 wt. pts. |
| Hydrophobic Quartz Dust, particle diameter approx. 4 Fm | HDK H-15 | Wacker GmbH | 0.60 wt. pts. |
| Adhesion-friction coefficient | 0.30 | | |
| Sliding-friction coefficient | 0.33 | | |

EXAMPLE 7
Separation Layer with 100% Release with Filler Material (Thermal Hardening

| | | | |
|---|---|---|---|
| Polymethylpolysiloxane capable of condensation polymerization | Dehesive 810 | Wacker GmbH | 15.0 wt. Pts. |
| Solvent | White Spirit | | 84.0 wt.pts. |
| Interlinking Agent | V-83 | Wacker GmbH | 0.7 wt.pts. |
| Catalyst | C 80 | Wacker GmbH | 0.3 wt.pts. |
| Alumo-silicatton, particle diameter approx. 4 Fm | Huber 95 | Huber Co. | 0.3 wt.pts. |
| Adhesion-friction Coefficient | 0.30 | | |
| Sliding-friction Coefficient | 0.33 | | |

What is claimed is:

1. Multi-layer composite body comprising a flexible auxiliary carrier and a separation layer arranged on at least one side of said flexible auxiliary carrier, said separation layer in flat contact with a functional layer and modifying the complete or locally limited separation of said functional layer, said separation layer comprising a continuous phase and a particle filler substance in a concentration of approximately 0.01 to 50% by weight relative to the separation layer, whereby the surface of the filler substance particles is completely covered by the continuous phase, the continuous phase comprising an interlinked polyorganosiloxane, and the roughness of the separation layer surface facing away from the auxiliary carrier has a roughness depth Rt of approximately 400 to 50000 nm and an average roughness value of approximately 40 to 5000 nm.

2. Composite body according to claim 1, wherein the average thickness of the separation layer is up to approximately 3 g/m² thick.

3. Composite body according to claim 1, wherein the particle size of the filler substance is approximately 0.01 to 20 Fm.

4. Composite body according to claim 3, wherein the particle size of the filler substance lies within a range of approximately 0.05 to 10 Fm.

5. Composite body according to claim 1, wherein the average particle size of the filler substance lies within a range of approximately 0.1 to 8 Fm.

6. Composite body according to claim 1, wherein the roughness depth Rt is approximately 600 to 2500 nm and the average roughness value approximately Ra 77 to 250 nm.

7. Composite body according to claim 1, wherein the roughness depth Rt is at least approximately 650 nm and the average roughness value Ra at least approximately 80 nm.

8. Composite body according to claim 1, wherein the particle filler substance comprises calcium carbonate, diatomaceous earth, clays, hollow glass pearls, aluminum silicate, plastics, magnesium carbonate, particle-forming polymer materials, specifically polytetrafloroethylene, talc, fibers, calcite, lime, mica, amorphous silicone dioxide and/or silicates.

9. Composite body according to claim 1, wherein the auxiliary carrier is a plastic foil.

10. Composite body according to claim 9, wherein the plastic foil is made of thermoplastic polyester and/or polyolefin.

11. Composite body according to claim 1, wherein the inter-linked polyorganosiloxane is produced by radical inter-linking of a polyorganosiloxane containing per molecule at least two alkyl-groups bonded to Si-atoms.

12. Composite body according to claim 1, wherein the inter-linked polyorganosiloxane is obtained by inter-linkage of an polyorganosiloxane with H-atoms bonded to Si-atoms and a polyorganosiloxane with alkenyl-groups bonded to Si-atoms.

13. Composite body according to claim 1, wherein the inter-linked polyorganosiloxane is produced from a polyorganosiloxane which contains groups capable of being hydrolyzed to silanol groups.

14. Composite body according to claim 1, wherein said composite body further comprises a functional layer on the separation layer.

15. Composite body according to claim 14, wherein the functional layer is an adhesive layer, a transparent or tinted plastic layer, specifically a pigmented plastic layer, a laminate from an adhesive layer and a transparent or tinted, a pigmented layer.

16. Method for the manufacture of a multi-layer composite body according to claim 1, in which a mixture of a polyorganosiloxane, containing inter-linkable groups with a particle filler substance, is applied according to a known method onto a flexible auxiliary carrier and inter-linkage of the polyorganosiloxane is subsequently realized.

17. Method according to claim 15, the step of inter-linkage is realized thermally by means of UV light or ionic beam.

18. Multi-layer composite body comprising a flexible carrier, a separation layer arranged on at least one side of said flexible carrier, and a functional layer arranged on said separation layer, said separation layer comprising a continuous phase and 0.01 to 50% by weight filler, the surface of the filler being completely covered by the continuous phase, the continuous phase comprising an interlinked polyorganosiloxane, and a roughness of the separation layer surface facing away from the carrier having a roughness depth Rt of approximately 400 to 50000 nm and an average roughness value of approximately 40 to 5000 nm.

\* \* \* \* \*